Jan. 3, 1956  H. EHRENSPERGER  2,729,534
LIGNIN-TANNED LEATHER AND PROCESS FOR MAKING SAME
Filed Sept. 7, 1955  2 Sheets-Sheet 1

Inventor
HANS EHRENSPERGER
Alan Swabey
Attorney

Jan. 3, 1956     H. EHRENSPERGER     2,729,534
LIGNIN-TANNED LEATHER AND PROCESS FOR MAKING SAME
Filed Sept. 7, 1955     2 Sheets-Sheet 2

Inventor
HANS EHRENSPERGER
By Alan Swabey
Attorney

000
United States Patent Office 2,729,534
Patented Jan. 3, 1956

2,729,534

LIGNIN-TANNED LEATHER AND PROCESS FOR MAKING SAME

Hans Ehrensperger, Mackayville, Quebec, Canada

Application September 7, 1955, Serial No. 532,947

17 Claims. (Cl. 8—94.31)

This invention relates to tanning to make leather and more particularly to a tannage in which converted lignin constituents of waste liqours from chemical pulping and other processes are employed as an active constituent and to a new type of leather made in this way.

This application is a continuation-in-part of applications S. N. 408,940, filed February 8, 1954, and now abandoned, and S. N. 484,318, filed January 26, 1955. Application S. N. 408,940 is in turn a continuation-in-part of application S. N. 190,875, filed October 18, 1950, and now abandoned.

PRIOR ART

Vegetable extracts are the usual agents used for tanning and their use is outlined in U. S. Patent 2,186,509, Wallace.

Converted lignins from sulphite waste liquor have also been tried as tanning agents. However, none of these attempts to use converted lignins have resulted in a complete tannage and have had to be supplemented by other conventional tanning steps to make the leather acceptable to the trade. For example, the Tappi Bulletin for February 27, 1946, states "these ligno-sulphonic acid salts, when used alone, give a relatively poor leather which is hard and tinny." A discussion of the subject is also contained in Patent 2,640,052, Stoddard Jr.

Synthetic tanning agents have been made by reacting ligno-sulphonic acid, from acidic waste liquor with other chemicals, for one example, with an aldehyde and urea. These tanning agents are made by condensing the active substances at a high temperature to form water-soluble polymers. These polymers are said to act similarly to vegetable tanning agents by their chemical affinity to hide tissue. Again, however, they only provide a partial tan and require supplementary conventional tanning.

Tanning agents have also been made by reacting alkali lignins from alkali waste liquors with chemicals, for example, chlorine, thereby to obtain a substituted lignin. Here again, the agent is only used to give a partial tan.

APPLICANT'S DEVELOPMENT

The applicant has now found that good tannage can be effected by depositing "in situ" in leather-making stock from an aqueous medium a water-insoluble precipitate having its origin in a water-soluble lignin derivative, a water-soluble aldehyde, and a water-soluble aldehyde-reactable amide selected from the group consisting of double acid amides, aminotriazines and water-soluble condensation products of said aldehyde with said amide.

When carried out as hereinafter described, this procedure provides a simple, direct, rapid and economical process for producing tannages having, along with other requisite properties of good leather, certain desirable characteristics of both chrome-tanned and extract leather.

For example, tannages produced in accordance with the invention have been found to exhibit the strength, fibre and permanency of chrome-tanned leather and the re-wetability and workability of extract leather. They have also been found to exhibit a fullness which is comparable to vegetable tannages and which can be controlled, as to firmness, by varying the concentration of the component ingredients of the tanning compound and the time or duration of the reaction involved in the production of such compound. The gain in weight of tannages produced in accordance with the invention is considerable and the colour of the tan where sulphite liquor derivatives are used with aldehydes other than furfural is a very light neutral colour which makes it possible to give the tannages any desired final colour, including the most delicate pastel shades. The ability to take dyes well is also a characteristic property of tannages produced in accordance with the invention.

The hide or skin is preserved by the process to prevent bacterial putrefaction and deterioration and has deposited within and around its fibres the insoluble inert ligno-reaction product of the invention. The presence of this material has the effect of keeping the fibres apart and thus increasing their flexibility and, at the same time, it has a filling or plumping effect. Depending upon the specific starting materials used, the leather has a characteristic colour as will be more fully elaborated. The tan is irreversible. It cannot be leached out. The chemical analysis of the leather is different from that of vegetable tanned leather. It resembles the analysis of chrome leather.

The specific procedure involved in carrying out the process of the invention is, as previously stated, relatively simple. The animal tissue to be tanned is first impregnated with the tanning agents at a relatively high pH at which the animal tissue is rapidly penetrated by such agents. The pH of the impregnated material is then without heating reduced to a lower value at which the tanning precipitate is formed and fixed in the animal tissue. The pH of the tanned material may then be raised to a suitable higher pH to condition it for subsequent fat liquoring and/or other routine tanning operations.

More specifically, the applicant's process contemplates a soaking step in which the tanning agents in water-soluble form are brought into intimate contact with the stock and a fixation step, in which these agents are insolubilized by pH adjustment to bring about tanning. In the soaking step the stock is soaked in a solution of the active substances, these substances caused to spread uniformly throughout the tissue of the stock. In the fixation step the active substances are reacted quickly by unstabilizing the solution to form "in situ" the insoluble reaction product which fixes itself in and on the stock to provide the tannage. The reaction takes place without extreme heating. The stock is thus kept standing in the treating liquid during and after the reaction without heating whereby the reaction product is fixed on and in the tissue.

The impregnation stage of the process during which the animal tissue is saturated with the tanning agents can be carried out at practically any pH above a critical range in the approximate neighbourhood of pH 3.5 in the case of sulphite liquor derivatives. During the reaction stage of the process which follows the impregnation stage the pH of the impregnated material is lowered to or below a pH value of approximately 3.5. During this reaction stage of the process the reagents react with each other and, possibly, with the animal tissue to produce tanned products having the desirable and advantageous characteristics previously referred to.

The specific pH in the soaking step will, however, vary depending on the particular liquor used. For waste sulphite liquor or sulphonic acid-lignins derived from it, the pH in the soaking step, as has been said, must be kept above the critical level of about 3.5 to maintain the active substances in solution. For alkali liquors, the critical level is not so definite and may vary for the particular liquor or liquor derivative used. Above about 8.5 the alkali-lignins in general remain in solution. Most of the alkali-lignins, derived from liquors generally known as kraft liquors, remain in solution at above pH about 6.5. Within these ranges, the critical pH for any specific liquor may be determined experimentally. (For a discussion of the terms "kraft" liquor and "block" liquor, see below.)

For the fixation step, therefore, the pH is reduced preferably well below the solubility range. There is, however, a "twilight" zone between the solubility range and the precipitation range within which partial precipitation may take place. In the case, for example, of sulphite liquor (or its converted lignins) this "twilight" zone will range from about 3.5 down to about 2.5. In the case of alkali liquor (or its converted lignins) the "twilight" zone may range down to about 5. The "twilight" zone in the case of some alkali-lignins, particularly kraft liquor, generally ranges down to about pH 5.5, but while it is possible in certain cases to operate in the fixation step near or above this level, it is preferable to reduce the pH to well below about 5.5 and better still below 5, when using alkali-lignins. As a general rule, therefore, in the fixation step, the pH is preferably reduced to well below the "twilight" zone in each case, to be sure of an immediate and rapid precipitation. Once the reaction is terminated, it is irreversible, the fixation is final and permanent.

DETAILED DESCRIPTION

The invention has been generally described above. Now it will be defined in greater detail by describing specific preferred aspects and variables. Reference will be made to the accompanying drawings in which.

PRECIPITATION STEP

The impregnation and acidification stages of the process may be carried out either as a one-bath or as a two-bath procedure. In the one-bath procedure, the acidifying agent is added directly to the impregnating bath after impregnation has been completed. In the two-bath procedure, the impregnated stock is removed from the impregnating bath and soaked in a second bath containing the acidic agent.

A variation in the carrying out of the acidifying stage of the process consists in removing the fully impregnated material from the impregnating solution and, after draining, exposing said material in a closed chamber to an atmosphere of acid vapours generated by vapourizing hydrochloric acid or one of the other vapourizable acids.

The carrying out of the impregnation and acidification steps of the process as separate stages has the advantage that, after removal of the impregnating material therefrom, the impregnating solution or bath may be reused with or without further addition of the reagents used in forming the tanning compound.

Other possible variations are as follows. The acid solution can be run into the tanning batch under agitation, for example in a drumming apparatus. The superfluous tanning liquid can be drained from the stock and then letting the acid solution run on to it. The soaked stock can be removed to a separate acidic bath for a short term dipping operation. The final effect is the same in each case. The choice is optional as a matter of economy as well as convenience.

Subsequent treatment of the stock is routine procedure which does not differ essentially from usual practice in the leather industry. Also, no departure is required as to the use of equipment employed in conventional tanneries either prior to or following the actual tanning operation.

THE REACTION

Figure 1:
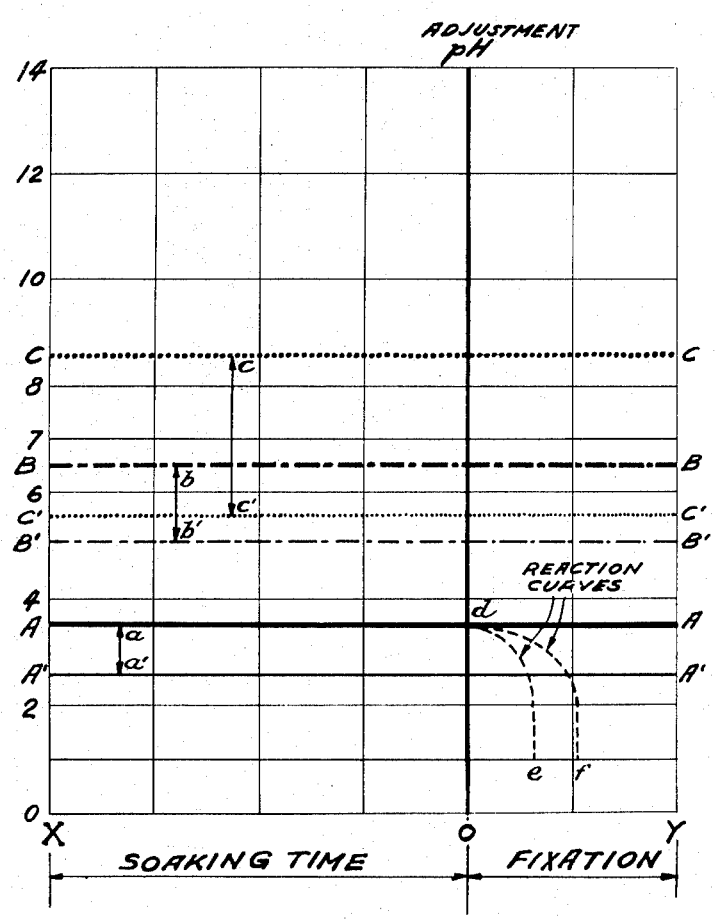
Figure 1 is a graph showing pH ranges for various formulations in the solubility and precipitation steps.

Figure 1 illustrates graphically the critical pH at which precipitation takes place for the various waste liquors used in accordance with the invention.

The line AA represents the critical pH for sulphite liquor from the Three Rivers, Quebec, Mill of The St. Lawrence Corporation Limited, line BB for kraft liquor from the East Angus Mill of The St. Lawrence Corporation Limited and the line CC for "black" liquor from the Howard Smith Paper Mills Limited, Cornwall, Ontario.

The vertical scale on the graph represents changing pH values. The direction from left to right represents time. When the pH is adjusted below the critical line in each case precipitation is induced or triggered off. The reaction proceeds rapidly as indicated in connection with the sulphite waste liquor by way of example. The curve d—e, for example, illustrates a quick reaction coming about by a quick adjustment of the pH. In the curve d—f, the pH is adjusted more slowly and the reaction takes place more slowly.

In either case, once the pH is reduced below the critical 3.5 value and particularly where it is reduced down below the 2.5 value the reaction takes place in a matter of minutes. This is to be contrasted, for example, with a condensation reaction between similar components in which heating is employed and the reaction is carried out over a long period to produce a water-soluble condensation product.

The critical pH limit rather than being an exact pH figure is best indicated by a "twilight" zone or band within which the speed of the reaction accelerates from zero to being instantaneous and complete. If the pH is adjusted quickly, reaction takes place rapidly in less than a minute. The same pattern is followed by the reaction in the case of the other liquors. The distinction between the curve for each liquor is merely in the location and extent of the transition period.

An important characteristic of this new tanning process is the fact that the soaking stage or penetration phase can be carried out at any pH above the critical band. This is especially interesting for acid-lignins because the first stage of the new tan can take place as mentioned before, on the acid, neutral, as well as the alkaline pH scale. This is a unique aspect. Conventional tannages are strictly regulated to narrow margins of operational pH limits. With the exception of straight formaldehyde tannage, they are all conducted on the acidic scale roughly within a pH range of from 5.5 to 3.5.

Where mixed acid and alkaline liquors are used, for example, the pH of the acid liquors may have to be brought up to the range of solubility for the alkaline liquors. In such case the critical pH for precipitation will then be adjusted accordingly.

The impregnation stage of the process naturally takes considerably longer than the acidification stage but can be speeded up by the use of suitable penetration-assisting agents such, for example, as various wetting agents and detergents. Sulphonated fatty acids and sulphonated fatty alcohols may be cited as examples of suitable penetration-assisting agents which can be used without interfering with the chemical mechanism of the tanning reaction.

TIME

The total time required for completing the tanning process is subject to some variation depending upon the type and average thickness of the hides or other animal tissue being tanned. However, as a general rule, the tanning of the heaviest cow hides can be completed within a period of twenty-four to forty-eight hours which is much faster than any of the known tannages in operation at the present time. In the case of thinner hides, such as sheepskin, which have a more open texture, the tanning can be completed in much less time than in the case of heavier hides or skins. On the other hand, the tannage of lizard skins and other skins with an epidermis of a tight or a "horny" nature may take longer. On average hide material, good tanning results are obtained in a period of twenty-four hours or less.

Thus the time for all types of stock is distinguished by its brevity over that of other types of tan operations. The soaking step requires generally only from about 2 hours to about 24 hours. The specific time in a particular case also depends on the condition of the stock.

In the soaking step the duration of the tan in its final analysis is simply a direct function of the speed or time it takes for the tan bath in the form of the triple solution of the three key ingredients to penetrate or diffuse uniformly throughout the tissue of the hide material. This speed or time of reaching maximum distribution and uniformity is naturally dependent upon two main factors; thickness and type of raw material. Other factors of minor importance are temperature concentration and condition of stock. As a rule, the heavier the stock the more time it takes. On the other hand, the type or anatomical structure, as well as beam house procedure in conditioning the skins prior to tanning, have their effect and influence upon the duration or progress of penetration of the tan.

For instance, as an illustration, the well opened, comparatively loose structure of sheep or seal hide tissue, with all the voids that held fats and oils before extraction, tans very quickly in a matter of a few hours, compared to the horny and tight anatomical construction of lizard or alligator epidermis which takes days to complete. Furthermore, there are great differences in one and the same hide itself. The belly portions of a cowhide, for instance, register fast penetration. Its butt parts take much longer. The duration of the tan is therefore timed as terminated when its toughest parts have reached full penetration.

The length of time required to complete the acidification stage of the process is also subject to variation. If during this stage using sulphite liquor derivatives, for example, the pH of the stock is suddenly lowered to about pH 2, the reaction proceeds rapidly and is completed in a matter of minutes. On the other hand, if the pH is lowered gradually by a gradual addition of the acidic agents and/or by the use of relatively weak acidic agents, the reaction is correspondingly slowed down and may require hours to complete. At this point, it may be noted that the reaction is exothermic and that, in the case where a high concentration of reagents is used in the impregnating stage, a too rapid lowering of the pH may have an injurious effect and should be avoided.

The transition from solution to precipitation can be lessened by dropping the pH by degrees, but there is not particular advantage in so doing.

As a rule the acidic adjustment is such that the reaction takes less than a minute to not more than 45 minutes to be complete depending upon the speed or resistance encountered in the stock material for penetration everywhere within its confines. Once the reaction is terminated it is irreversible and permanent. This concludes the actual process. For good measure the stock is left standing overnight before proceeding with washing and other subsequent routine finishing operations.

Once the precipitation is accomplished within the confines of the tissue, it is irreversible. It cannot be washed out under ordinary circumstances nor will hot water have any effect upon it. The tan is fast and permanent.

As previously stated, the completion of the acidification stage of the process may sometimes be followed by a de-acidifying step to raise the pH of the stock to condition it for fat-liquoring and other routine tannery procedure. This de-acidifying step may be carried out, to any desired degree, by the use of buffering agents in the form of ammonium chloride or mild alkalies such as borax, ammonia, sodium carbonate, sodium thio-sulphate, sodium bicarbonate and the like.

TEMPERATURE

Preferably the temperature in the soaking step is that of the surroundings or ordinary temperatures according to season. At any rate, however, it is seldom critical. If, however, any factors should tend to raise the temperatures, as for example, mechanical friction while drumming, steps should be taken to keep the temperature below about 45° C. This can be done by resting the wheel at intervals.

It should be recognized that while the reaction between the active substances is exothermic, these substances are used in such a dilution that there is no substantial raise in temperature that any rise in temperature is inconsequential, and does not have any deleterious effect in the tanning process.

CONVERTED LIGNINS

Waste sulphite liquors resulting from the sulphite process of pulping lignocellulose materials are preferably used in the process to provide the lignin derivative component of the tanning compound. However, lignin-containing liquors resulting from the various other chemical pulping processes used in the pulp and paper industry may also be employed. The lignin derivative used may also be in the form of a concentrate or solid obtained from the lignin-containing liquors by evaporation.

The applicant has referred to the lignin derivates used in the present invention generally as water-soluble lignin derivatives. Lignin is actually a group name for the non-cellulose components of woody fibre. The converted lignins of the present invention are lignin derivatives not found in nature, neither do they belong in the category of extracts because they are chemically modified and thus different from the original native lignin in woody fibre.

Generally speaking, the water-soluble converted lignin derivatives used in the invention occur in the waste liquors from chemical pulping processes. However, other converted lignins, for example, those which result from solubilizing cellulose by saccharification processes, like those of Bergius and Scholler may be used.

The liquors classify generally under the headings "Acid-liquors," and "Alkaline-liquors." The residual lignins from the saccharification process are solubilized with alkali and other agents but generally fall into the alkaline group. The converted lignins isolated from acid-liquors may be termed sulphonic acid-lignins and the converted lignins from alkaline liquors, alkali-lignins.

Waste sulphite liquor is in the main, acid liquor. This is conveniently defined in the April 1949 issue of the periodical "Chemistry in Canada" at page 36 substantially as follows. In the sulphite pulping process, the wood chips are cooked with calcium bisulphite-acid solution. At the end of the cooking about half the original wood remains as a more or less pure form of cellulose and the balance of the wood (lignin, sugars, etc.) dissolves and is known as waste sulphite liquor.

The main constituent of sulphite waste liquor is ligno sulphonic acid, a lignin derivative in which at least one sulphonic acid radical has been introduced into the lignin-unit molecule by means of the chemical acid cook of the pulping operation. The lignin sulphonic acid in acid liquor is present in the form of a salt corresponding to the particular base-material used in preparing the bisulphitic acid. The most common bases are calcium, magnesium, ammonium and sodium. Sulphite waste liquors are all strongly acid, having a pH of approximately two above or below when freshly blown. However, if a concentrate, or better still, solids are made therefrom, they lose most of their acidity by loss of volatile acid fractions during the evaporation process. The solid residues when dissolved show a pH of around 4.5.

Waste sulphite liquor is a well known term in the pulp and paper industry and so is readily understood by those familiar in the art.

Alkali-lignins (see Patent 2,639,968 for example), include the converted lignins formed when wood or other lignocellulosic material is subjected to hot alkaline digestion usually under pressure. It is contained in the spent liquor resulting from pulping wood by, for example, the soda process, the sulphate or kraft process, or the alkaline sulphite process. There may be some more or less minor differences in the specific constitution of the alkali-lignins, depending on whether they are derived from the soda, sulphate or alkaline sulphite process in which varied proportions of alkaline chemicals such as caustic alkali, sodium sulfide, sodium carbonate, sodium sulphite as well as neutral sodium-sulphate are used. Alkali liquors usually have a pH above about 9.5.

There is a certain amount of confusion in the trade in referring to alkali-liquors. Black liquor seems in some quarters to be used as a generic term which includes kraft liquor as well as a liquor which differs from kraft liquor and is known as black liquor. In other words, the term black liquor is sometimes used as generic to alkali-liquors and is sometimes used to define a specific material within the generic definition and which differs from kraft liquor. The applicant has not, therefore, attempted to distinguish these terms. However, it should be noted that the liquor identified by the Howard Smith Paper Mills Limited at Cornwall as black liquor showed a critical solubility (in combination with the amide and the aldehyde) pH of about 8.5 as shown in the graph (Figure 1). At the same time, this "black" liquor showed a twilight zone extending down to about 5.5 pH. In contrast, other liquors identified by the Mills of their origin as "kraft" liquors showed a critical pH of about 6.5 and a twilight zone reaching down to about pH 5.

Insoluble lignins resulting from cellulose saccharification which can be used according to the invention are defined in the "Tappi Bulletin" published by the Technical Association of the Pulp & Paper Industry, New York, for February 27, 1946, and the pamphlet entitled "The Chemical Utilization of Wood," by C. Greaves and H. Schwartz, published by the Canadian Department of Resources and Development, Forestry Branch. According to the latter, the saccharification processes are carried out as follows:

"Cellulose and other polysaccharides may be converted into simple sugars by treatment with mineral acids under suitable conditions of temperature and acid concentration. This process is called hydrolysis or saccharification, and its application to the commercial production of sugar solutions from wood or wood waste has met with success in a number of countries, particularly in Germany.

"The two main processes in commercial operation in Germany prior to and during World War II were the Scholler and the Bergius. The general details of the Scholler process for the saccharification of wood are as follows. Batches of dilute sulphuric acid of 1.2 to 0.4% concentration are allowed to percolate through wood in a digester at a temperature varying from about 135° C. at the start of a run to about 190° C. at the end. The temperature is controlled by varying the steam pressure. After each batch of acid is added, sugar solution is drawn off from the bottom of the digester, and the wood in the digester is then steamed prior to addition of another batch of acid. In the United States, during the war years, a number of improvements were made to the Scholler process. This process was changed from batch acid-addition to continuous acid-addition, and to continuous drawing off of sugar solution. In this way, the time required for hydrolysis was reduced from 12 to 16 hours to 3 hours. Sugars are obtained in solution in a concentration of 4 to 5% and in a yield of 50 to 60% of the dry weight of the wood. By fermenting the sugars obtained from one ton of dry wood, there can be produced about 42 to 50 gallons of ethyl alcohol.

"The Bergius process uses concentrated hydrochloric acid at room temperature to hydrolyze wood."

Such a lignin is an almost black crumbly mass, more or less pure, and still shows the structure of wood. Because of polymerization and condensation reactions, it is insoluble in any solvent and therefore is hardly reactive.

The Bergius and Scholler lignins can be converted into soluble products by heating them at 160° to 170° C. for about one hour with 5 to 10% sodium hydroxide solution. The lignin dissolves in the alkaline solution as so-called alkali lignin and can be separated in a solid form by acidifying the alkaline solution either with carbon dioxide or with mineral acids. This gives an alkaline lignin that is similar to that obtained from a soda black liquor and is free from any carbohydrate material. It can be utilized in the same way as alkali lignin from the soda process black liquor. Mixed lignin derivatives may be used.

The liquors themselves may be used in dilute or concentrated form or evaporated to dryness. Alternatively, purification products can be used. For example, acid lignin as lignosulphonic acid in the form of calcium, magnesium, sodium or ammonium salts can be used. Similarly purified alkali-lignins can be used.

In other words, it appears that identical reactions take place, irrespective of the type of water-soluble lignin derivative employed. This new reaction principle seems to be a characteristic of the lignin molecule as a whole and not dependent on any radical or groups of radicals attached thereto. The lignin derivatives from chemical pulping waste liquors are, however, preferred.

AMIDE COMPONENTS

Double acid amides in general include theureas. The preferred double acid amide is urea, but it is entirely feasible to use various other suitable amides as well as various derivatives of urea.

Actually, water-soluble double acid amides in general may be used in carrying out the invention. Examples of these amides may be represented by the following formula:

where the radical R is selected from the groups CO, CS, SO$_2$, CO—CO, CO—(CH$_2$)x—CO, where X is an integer, and CO—NH—CO.

Specific compounds which may be mentioned as being suitable besides urea are thiourea, sulfurylamide, oxamide, malonic acid amide, succinic acid amide and biurea.

As mentioned before, the preferred water-soluble double acid amide is urea. It should be understood that an amide which is not of itself sufficiently water-soluble to put into solution may be used according to the invention by adding with it a solubilizing agent, for example, a strong acid. Mixtures of more than one of the double acid amides may be used.

Ureas and substituted urea derivatives may be employed, such as urea, thiourea, diurea, hydroxyurea, methylurea, methylol ureas, e. g., monomethylolurea and dimethylolurea, methylene ureas, e. g., methylene diurea, iminourea (guanidine) and the like. See D'Alelio, U. S. Patent No. 2,320,816, the entire disclosure of which is incorporated by reference. Actually, any water-soluble substituted urea may be used which posseses at least one —NH— aldehyde reactable atom group.

In place of the urea or substituted urea, there can be employed the urea equivalents in the form of dicyandiamide and melamine and other water-soluble aldehyde reactable aminotriazines, having at least one —NH— aldehyde reactable atom group. Any of the aldehyde reactable aminotriazines disclosed in D'Alelio U. S. No. 2,368,451 and Widmer et al. No. 2,197,357 can be employed. The basic aminotriazines belonging to this group are represented by the folowing formulae:

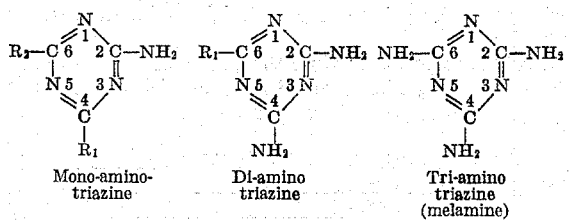

Mono-amino-triazine    Di-amino triazine    Tri-amino triazine (melamine)

in which $R_1$ and $R_2$ are mono valent radicals, represented by atoms and atom groups, such as —H, e. g., formoguanamine, —OH, e. g., ammeline and ammelide, —NO₂, —Cl, alkyl, e. g., acetoguanamine, aryl, e. g., benzoguanamine, and the like, as long as they are water-soluble or water-soluble in the presence of an aldehyde. Further, by disamidation one triazine system may be linked with another one by an amino —NH— bridge resulting in melam, melon and melem compounds which still possess aldehyde reactable —NH₂— and/or —NH— groups.

The preferred aminotriazine is triaminotriazine (melamine) which is technically produced in large quantities.

Melamine as such is only slightly soluble in water (1 to 300). To make it water-soluble it is combined with formaldehyde in different proportions and put on the market under various trade names.

Preformed, partial reaction products of ureas and water-soluble aldehydes, e. g., monomethylol urea, dimethylol urea and sesqui methylol urea, of water-soluble aminotriazines with water-soluble aldehydes, e. g., monomethylol melamine, trimethylol melamine and hexamethylol melamine or of mixed ureas and aminotriazines with water-soluble aldehydes, e. g., an equimolar mixture of urea and melamine with 4 mols of formaldehyde may be employed.

ALDEHYDES

The preferred aldehyde is formaldehyde but may be replaced by various other aldehydes such, for example, as acetaldehyde, furfural, glyoxal, etc.

Actually, aldehydes which may be used in the invention are the water-soluble aldehydes or water-soluble aldehyde-yielding substances. Specific examples which are useful are formaldehyde, furfural, acetaldehyde, glyoxal and crotonaldehyde, with the two former preferred. The other aldehydes mentioned work more slowly, but used in a mixture with formaldehyde work well.

Formaldehyde may also be used in its different modifications, including solid substances which yield formaldehyde. For example, paraformaldehyde or trioxymethylene and hexamethylene-tetramine are solids in which formaldehyde is available for reaction in solution under proper conditions. These solid modifications of formaldehyde are particularly welcome for the compounding of all key ingredients into solid, dry tan mixtures which are complete by themselves as dry formulae.

Using furfural, the precipitate is obtained in the form of a jet black powder which resembles carbon black. Used under tan conditions of these specifications, a black tan throughout the tissue is the result.

Mixtures of a plurality of aldehydes may be used.

It should be mentioned that when an aldehyde, formaldehyde, for example, is added in an aqueous solution with an amide, for example, urea, there may be formed at least up to a point, a water-soluble primary reaction product, for example, methylolurea and dimethylolurea. Methylolurea, for instance, has been suggested as belonging to the amide member of the active group of agents, since, usually, additional formaldehyde is needed as well, even though the primary reaction products may, on occasion, be used as such without additional formaldehyde. Actually, therefore, the use directly of such water-soluble primary reaction products directly falls within the scope of the invention.

For convenience, however, the procedure has generally been described in terms of starting with an aldehyde and an amide, and the impression may be gathered that these materials retain their identity as such during the soaking step, even though primary reaction may take place to form a water-soluble reaction product, which, in turn, reacts with the lignin derivative to form the final insoluble reaction product. The exact mechanism of the invention is not entirely clear and, moreover, is not material, since the procedure for carrying out the invention is clearly specified.

These partial reaction products must remain water-soluble and, usually, possess an excess of the aldehyde so as to remain reasonably stable at ordinary temperatures. They are technically and commercially made in large quantities and sold under a variety of trade names of the manufacturer.

These preformed, partial reaction products can be used according to the invention to replace in whole or in part the amide component of the process. The end result is the same, whether the critical ingredients are introduced individually or collectively, particularly referring to preformed amide and aldehyde components in water-soluble form.

These preformed, partial reaction products can be easily obtained from the chemical industry. The aldehyde most always used is formaldehyde and in most cases contains an excess of it.

To prepare for tanning, ligno matter is added to form an aqueous, clear and stable solution in which the hide material is soaked.

It should also be explained that, while usually an aldehyde and a double acid amide are added in water with the lignin derivative, an aldehyde donor or an amide donor or both may be substituted for the aldehyde or amide, as the case may be.

Amide donors under reaction conditions of the present invention produce or generate an amide, particularly, urea. Such donors for instance are: cyanamide, giving urea upon hydrolyzation, thiourea, producing urea upon oxidation and guanidine being transformed into urea under alkaline conditions.

These three substances, for instance, can be introduced in whole or part into a tanning bath, adjusted as to respective conditions to produce urea.

For certain cases, this procedure may prove of advantage because the urea can be made to generate spontaneously at a certain rate of speed.

The combined employment of one, two or more amides, as well as aldehyde components, can be used to bring out special qualities and properties of the resulting leather which either employed by itself cannot produce. Properties of leather so influenced are resiliency, firmness, feel, fullness, elasticity and the like.

Practice and experience will eventually establish certain preferred poly-mixtures of the critical tan ingredients. The fundamental tan procedure always remains the same, that is to say, aqueous soaking phase for maximum distribution followed by the precipitation stage.

The formation of primary reaction products between the aldehyde and the amide constituent has been discussed in terms of double acid amides, for example, urea. However, this discussion applies equally to primary reaction products and the aldehyde and aminotriazines.

The important feature of the invention is that there is ultimately deposited within and about the fibers of the leather-making stock a water-insoluble reaction product which is inert and irreversible and finds its origin in a water-soluble lignin derivative, an aldehyde and a double acid amide and/or aminotriazine, no matter whether the aldehyde and amide and/or aminotriazine are added as such to form with the lignin derivative the aqeuous tanning bath, or as water-activated aldehyde donors which in the aqueous solution yield aldehyde and/or amide and/or aminotriazine, or whether the aldehyde and amide remain as such in the soaking medium or whether they are partly or wholly converted to a primary water-soluble product, or whether such a product is added directly in place of the aldehyde and amide and/or aminotriazine. Actually, the formation of such a reaction product depends on conditions within the bath. For example, methylol urea is believed to be formed in a neutral or mildly alkaline solution. These variations do not interfere with the precipitation and resulting tanning effect, nor does the order that the agents are added.

It should also be explained that there may be an excess of the precipitate formed which does not actually stay on and within the leather. This precipitate may be recovered from the tanning vessel. It has various uses, for example, as a filler, filter material and pigment.

AMOUNT OF TANNING AGENTS

The amount of active tanning ingredients in the solution on a solid basis can range from about 5% for incomplete tanning to more than 50% by weight, for example to 100% on fresh stock preferably as a rule between 18% and 40%. This is not critical as will be recognized by a tanner. It will depend on the results desired.

PROPORTIONS

The results obtained in carrying out the process do not appear to be dependent on any well defined relationship with respect to the relative quantity and proportion of the amide, aldehyde and lignin reagents used in forming the tanning compound. Likewise, the order in which these three critical reagents are introduced into the animal tissue apparently can be varied without appreciable change in the appearance of the tanned product. In this connection it has been found that during the impregnation stage the three critical reagents may be introduced into the animal tissue either simultaneously or separately and that, in the case of separate introduction, the order in which the three critical reagents are introduced does not apparently change the results. The important consideration appears to be the simultaneous presence of the three critical reagents in the animal tissue prior to reducing the pH of the latter to or below a pH value of approximately 3.5 for sulphite liquor or the critical values for the other soluble lignin derivatives as the case may be.

The impregnation stage of the process may be carried out by soaking the hides, skins or other animal tissue in an aqueous solution or bath containing the tanning reagents and having a pH substantially higher than pH 3.5, for example in the case of sulphite liquor lignin derivatives. The tanning reagents are thus distributed throughout the tissue and presumably within the fiber cells of the impregnated material with a density which depends on the concentration of the soaking solution and the thoroughness with which penetration is effected. During this impregnation stage and/or during the subsequent acidification stage, it is possible that the tanning reagents react, either simultaneously or separately, with the animal tissue itself but this has not been definitely determined. Such reaction appears likely, however, in the case of aldehydes, particularly formaldehyde, which are known to have a definite chemical reactivity with animal tissue as evidenced by the formaldehyde tannages which have been developed by the art.

While the nature and constituents of the complex compound formed by the interaction of the amide, aldehyde and lignin reagents is not known, it has been observed that, during acidification of a relatively dilute solution of these reagents, the resulting compound is precipitated in the form of microscopically fine powder. With the raising of the concentration, the compound obtained varies from the finely dispersed phase to very hard solids or aggregates.

The proportions of the three key ingredients of lignin derivative, urea, and formaldehyde in relation to each other are not particularly critical. In practice, however, for reasons of economy and otherwise, it is aimed at using large proportions of the converted lignin. Composition using as much as about 66% by weight and even more are effective.

For purposes of tanning, the preferred proportioning of the three ingredients may be expressed in broad terms by the following round figures:

|  | Percent |
|---|---|
| Water-soluble lignin derivative (solids) | 40–60 |
| Urea | 20–40 |
| Formaldehyde (37%) | 17–30 |

Figure 2:
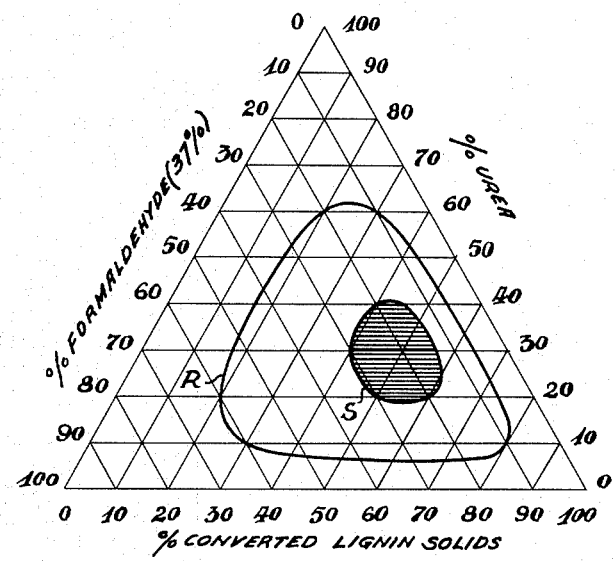
Figure 2 is a graph showing suggested ranges of relative proportions of the active constituents.

To give an indication of the relative amounts of the three active agents which the applicant prefers to employ, the amounts have been shown on Figure 2. The horizontal axis represents from left to right increasing proportions of lignin derivative solids. The right-hand diagonal in the upward direction represents increasing percent urea. The left-hand diagonal in the downward direction represents increasing percent solids by weight of the total composition with the exception of formaldehyde which are parts by weight as fluid.

The proportions shown hold for all types of lignin derivatives as well as for all types of aldehyde and amide components described.

Actually the proportions are not particularly critical. A suggested range is given within the outer ring R and a preferred range within the inner ring P in Figure 2.

FORMULAE

The tanning materials can be prepared in the form of pre-mixed stable solutions having a pH at least about 2 above the critical limit of solubility.

In certain cases, dry formulae can be compounded. This type of formula may include two solid ingredients, for example, the lignin derivative and the amide. Then, the aldehyde is applied at the site of tanning. Or, a solid aldehyde or aldehyde-yielding material can be pre-mixed with the amide and lignin derivative. Care must be taken that the formula is moisture-free, for example, containing less than about 3% by weight of moisture, and protected from picking up moisture by being placed in moisture-proof containers.

As an example, for dry formula containing two components the following may be compounded:

3.2 parts urea by weight
5 parts sulphite waste liquor solids by weight

This formula requires approximately 3.5 parts of liquid formaldehyde.

As an example for dry formula containing the three components the following may be compounded:

3 parts urea by weight
6 parts sulphite waste liquor solids by weight
2 parts para-formaldehyde by weight

MODIFYING CHEMICALS

Any pH adjusting which may be required for the soaking step can be done with a great variety of chemicals as long as they do not cause the equilibrium of the three key ingredients to be upset, for instance by causing premature precipitation. Besides serving in the capacity of mere pH adjustment, single chemicals or combinations can serve multiple purposes. Among these, the property of serving as buffer chemicals is the most important to which, for instance, sodium acetate, sodium formate, phosphates and ammonium chloride, belong. Other chemicals serve as tissue softeners, penetration assistants, while still others have a "plumbing effect." Wetting agents may be employed to enhance penetration into the stock.

Used in moderation and in the right combinations, the effect of this new tan can be enhanced by the use of these assistants, although the fundamentals remain the same.

ACIDS

The lowering of the pH upon completion of the impregnation stage of the process is accomplished by acidifying the impregnated material with a suitable acid. For this purpose I prefer to use hydrochloric acid but it is also feasible to use various other organic and inorganic acids or acidic agents such, for example, as acetic acid, alums, sodium bisulphite, sodium bisulphate, aluminum sulphate, ammonium sulphate, ammonium chloride, ammonium nitrate, sodium hydrosulphite, zinc chloride, aluminum chloride, lactic acid, oxalic acid, phosphoric acid, sulphuric acid, nitric acid, etc. Various combinations of the acidic agents here referred to may also be employed.

Therefore the acidic substances used to adjust the pH from the soaking step to the fixation step can take the form of straight acids, organic as well as inorganic, or acidic salts, which can bring the pH down low enough to induce precipitation.

STOCK

The hide material or other animal tissue to be tanned should, of course, be treated when necessary to properly condition it for the tanning process. For example, the stock material to be tanned should be substantially neutral and free from grease stains that impede the penetration of the material by the reagents used in the tanning process. Hides which have been pickled in a sulphuric acid pickle frequently have a pH as low as pH 1.5 and must be given a preliminary deacidifying pretreatment to raise the pH to approximately pH 4 or higher.

Generally speaking, the tanning process of the invention may be used in conjunction with the usual stock handling operations employed in conventional tannages both prior to and following the actual tanning.

The applicant has referred to the material to be tanned to produce leather in general terms as "leather stock."

The "stock" may be any animal surface tissue such as raw hides and raw skins also such which have been pre-tanned. The stock may, for example, have been pretanned by vegetable or any other conventional tanning agents.

The hides or skins may be of cow, or other domestic animals as well as wild animals, also snake, alligator, fish or the hide or skin of any other creature employed in the regular way to make leather.

The stock should be substantially free from grease or fat or "oily" stains or layers which, if present, would prevent or at least impede the penetration of the aqueous solution, or result in an uneven tan revealing untanned portions or such only partially tanned, where grease or oils have interfered.

As a general rule, there are two types of stock available, bated stock and pickled stock.

Bated stock is freshly de-limed stock with a pH substantially around neutral or 7.0.

Pickled stock is de-limed or otherwise processed hides in which the pH varies anywhere from 3.5 or thereabouts to as low as 1.0. The acid used for this purpose is mostly sulphuric.

Therefore, as a rule pickled stock material should be conditioned or adjusted to a higher pH prior to the actual tanning operation. This can be done principally in two ways. First, a separate bath operation with either plain water or water containing the necessary neutralizing chemicals can be given to raise the pH to the desired level to conform and harmonize with that of the actual tan solution. Second, the tan solution itself contains the necessary chemicals to bring the pH of pickled stock rapidly up to 3.5 and above, and maintain it there. Therefore, all stock material, bated, pickled or prepared in other ways can now be tanned directly in one and the same operation. In other words, bated stock need not be pickled and pickled stock need not be de-pickled but used directly as it is.

In practical application this amounts to three fundamental tan operations, hitherto separated, now combined into one, by which either bated, de-pickled or pickled stock can be used direct, which is another feature unique for this new tannage.

Furthermore, the margin of safety of the tan operation in actual practice exceeds that of any of the conventional tannages. This applies in particular to tanning using acid-lignins. Whereas chrome and bark tannage for instance are confined to very narrow limits of pH range above and below which the leather becomes adversely affected to the point of sometimes being a total loss, the opposite is true of this new tannage.

The critical point is that the pH separating the soaking and precipitation phases must not be passed until uniform diffusion throughout the tissue of the active substances has been reached. The soaking phase is adjusted only to considerations of convenience, economy and desired properties of leathers that are produced.

The stock may have been partially tanned by some conventional tanning method and the invention employed to complete the tan. It is sometimes, for example, the practice to preserve skins or hides by tanning them partially before shipment, the tanning proper being accomplished at their destination. The invention contemplates tanning such stock.

LEATHER

Leather, by definition, is the skin of an animal or part of such skin, tanned, tawed, or otherwise dressed for use to render it resistant to putrefaction and relatively soft and flexible when dried. The tanning agent is usually a reaction product with a constituent of the skin and is deposited in and about the fibers of the leather.

The leathers made in accordance with the invention have the desirable characteristics of leather tanned by conventional tannages but in addition, they have characteristics of their own which distinguish them from conventional leathers, as discussed above.

For example, the reaction product is deposited in and about the fibers and at the same time the leather is preserved as with other tannages to resist putrefaction or other deterioration.

If furfural is used as the aldehyde, a colour-fast black leather will result.

The applicant's leathers are characterized by the fact that the tannage is permanent, that is, irreversible as compared with conventional tannages, as for example, extract and chrome tannages. Apparently, the precipitate formed by the active substances in the fixation step is fixed within and about the fibers of the stock. And, this precipitate is a water-insoluble triple complex compound being a lightweight, bulky, non-compressible, extremely fine, amorphous power with "lubricating" properties like talcum. In the case of sulphite liquors it is creamy white to buff in colour. In the case of alkaline liquors it is darker. The furfural reaction product is jet black.

The precipitate is chemically inert. It is insoluble in cold and boiling water, insoluble in acids, insoluble or only partially soluble in strong alkalies. It has no melting point. It carbonizes only under high temperatures. It is insoluble in organic solvents. It is inert to oxidizing agents. It is fast in colour when exposed to direct sunlight for any length of time. Apparently, the fixation and chemical properties of this precipitate keep the individual fibers of skin or hide tissue separate and apart from each other and thus prevent shrinkage and undue stiffness.

The leather produced by the sulphite liquor tannage using aldehydes other than furfural has a pale or almost neutral colour. The leather can, therefore, be coloured in delicate pastel shades. Besides, the natural colour resulting from the tan is fast to light and will not darken or stain as will vegetable extract-tanned leather.

The leather produced by alkali liquor tannage has a darker colour. It resembles extract-tanned leather. Its colour, however, is permanent.

The amount of the precipitate present in the leather can vary in a wide range say up to about 30% to about 50% by weight, or more, but a lower figure of say upwards from about 5% to about 35% usually suffices and is preferable.

The tannage is a true ligno-tannage, as distinct from any others as is chrome or bark or extract leather for instance. It is self-contained, requiring no supplement of any kind. It is based on formation of a compound which is inert and irreversible, transferring these properties to the new leather it produces. Its chemical analysis is distinctly different from that of bark or vegetable extract tan. In the same way, it resembles the one of chrome. By this means, it can be easily identified as a new leather altogether.

Its rewetting properties are extraordinary; they are better than vegetable tan conventional leathers. Chrome, for example, has little rewetting property in comparison. Its shrinkage temperature approaches the one of chrome in sharp contrast to vegetable tanned leather which is very sensitive to temperature above approximately 120° F.

The invention is also characterized by the following additional advantages: it can be carried out with the use of conventional tanning apparatus without any substantial departure from routine tanning practice; the reagents or ingredients used in forming the tanning compound can be obtained in unlimited quantities from readily available sources of supply at reasonable costs; the converted lignin component of the tanning compound can be used in the form of lignin-sulphonic acid as found in waste sulphite liquors, thereby providing another solution for the waste sulphite liquor disposal problem which has long plagued the pulp and paper industry; the precipitate by which the tanning is effected is characterized by many chemical and physical properties which make it an ideal tanning agent. This compound is chemically inert to alkalies and ordinary reagents and is limited to solubility in acids at high concentrations. It is relatively insoluble in inorganic as well as ordinary organic solvents. It has no melting point and will withstand very high temperatures before carbonizing. Moreover, a conventional tan can be given to animal tissue either prior to or after such animal tissue has been tanned in accordance with the invention. It may also be noted that the tanning materials used in accordance with this invention may be used in conjunction or admixture with the tanning materials employed in vegetable, chrome, and other conventional tanning processes.

The invention will be further explained by reference to the accompanying examples which are characteristic of the invention but do not necesarily limit its scope.

*Example 1*

Stock material.—Pickled sides; pickled splits, pH 1.7

The pH of the stock was adjusted by drumming it for several hours in a pH adjusting solution containing 5% thiosulphate and then letting the stock stand overnight, then draining.

The stock was then drummed in a tanning solution prepared in accordance with the following formula:

|  | Percent |
|---|---|
| Sodium chloride | 7 |
| Thiosulphate | 8 |
| Urea | 12 |
| Sulphite waste liquor solids | 15 |
| Formaldehyde (37%) | 29 |
| Water | 29 |
|  | 100 |

The drumming of the stock in the tanning solution was continued for a period of 24 hours at the end of which time the pH of the tanning solution was found to be approximately pH 6. Dilute hydrochloric acid having an acid concentration of approximately 7% was then added to the tanning solution to lower the pH to the 1.7 pH range. After further drumming for several hours, the stock was permitted to stand overnight in the tanning solution and was then removed for washing and processing in the usual routine manner.

*Example 2*

Stock material.—Pickled side, pH 1.7.

In this case, the pH of the stock was initially adjusted to a suitable pH value for the tanning process by soaking it overnight in a pH adjusting solution containing thiosulphate, sodium chloride, sodium bicarbonate, formaldehyde, in the following proportions:

|  | Percent |
|---|---|
| Thiosulphate | 5 |
| Sodium chloride | 5 |
| Sodium bicarbonate | 1 |
| Formaldehyde | 1 |

The stock was then drummed in a tanning solution prepared in accordance with the following formula:

|  | Percent |
|---|---|
| Sodium chloride | 5 |
| Thiosulphate | 8 |
| Urea | 10 |
| Sulphite waste liquor solids | 25 |
| Formaldehyde | 15 |
| Water | 37 |
|  | 100 |

The stock was drummed in the tanning solution for a period of 18 hours. A dilute hydrochloric acid solution having an acid concentration of approximately 7% was then slowly added to the tanning solution over a period of approximately 4 hours to lower the final pH down to the pH 1.7 level. The stock was permitted to stand overnight in the acid solution and was then removed and further processed in routine fashion.

*Example 3*

Stock material.—Pickled side, pH 1.7.

In this case, the pH of the stock was adjusted to a pH value suitable for the tanning operation by soaking it overnight in a pH adjusting solution containing 10% thiosulphate and 5% sodium chloride. The stock was then drummed in a tanning solution prepared in accordance with the following formula:

|  | Percent |
|---|---|
| Sodium chloride | 10 |
| Urea | 5 |
| Sulphite waste liquor solids | 7.5 |
| Water | 77.5 |
|  | 100.0 |

The stock was drummed in the tanning solution intermittently for a period of 30 hours. A solution of formaldehyde having a formaldehyde concentration of approximately 6% was then added to the solution and the drumming continued for another period of fourteen hours. A dilute solution of hydrochloric acid having an acid concentration of approximately 1.5% was added to the solution and the drumming continued to give a total drumming period of approximately 48 hours after which the stock was permitted to stand in the tanning solution overnight and was then removed and processed in routine manner.

Example 4

*Stock material.*—Pickled splits, pH 1.5+.

In this case the stock was initially soaked overnight in a pH adjusting solution containing 10% sodium chloride and 5% thiosulphate. The stock was then drummed in a tanning solution prepared in accordance with the following formula:

| | Percent |
|---|---|
| Sodium chloride | 3.5 |
| Urea | 4.4 |
| Sulphite waste liquor solids | 7.0 |
| Sodium bisulphite | 1.8 |
| Water | 83.3 |
| | 100.0 |

The stock was drummed in the above-mentioned tanning solution intermittently for a period of 19 hours. A 5% solution of formaldehyde was then added to the hide tanning solution and the drumming continued for a further period of four hours, at the end of which time 1% of concentrated hydrochloric acid was added to the solution and drumming continued to give a total drumming period of approximately 24 hours. The drum was then emptied and the pH at that time was found to be 1.7.

Example 5

*Stock material.*—Pickled sides, pH 1.5+.

In this case, the stock was soaked overnight in a pH adjusting solution containing 10% sodium chloride and 5% thiosulphate. The stock was then drummed in a tanning solution prepared in accordance with the following formula:

| | Percent |
|---|---|
| Sodium chloride | 3.5 |
| Urea | 4.4 |
| Sulphite waste liquor solids | 7.0 |
| Sodium bisulphite | 1.8 |
| Water | 83.3 |
| | 100.0 |

The stock was intermittently drummed in the tanning solution for a period of 24 hours. Formaldehyde in the amount of 5% was then added to the solution and drumming continued for a further period of 20 hours. One per cent of concentrated hydrochloric acid was then added to the solution and the drumming continued to give a total drumming time of approximately 48 hours. At the end of this period, the pH was found to be 1.8.

Example 6

*Stock material.*—Bated sides, pH 7.0.

In this case, the stock material went directly into a tanning solution prepared in accordance with the following formula:

| | Percent |
|---|---|
| Sodium chloride | 3.5 |
| Urea | 4.4 |
| Sulphite waste liquor solids | 7.0 |
| Sodium bisulphite | 1.8 |
| Formaldehyde | 5.0 |
| Water | 78.3 |
| | 100.0 |

The drumming of the stock in the tanning solution was continued intermittently for a period of 36 hours and 1½% concentrated hydrochloric acid was then added to the solution over a period of 90 minutes to lower the pH to the 1.7 level.

Example 7

*Stock material.*—Pickled standard type bag leather, pH 1.5.

No adjustment as to the pH of the stock was made prior to introduction of the stock into the tanning solution. The stock was not pre-soaked or pre-washed but was drummed in a tanning solution of the following formula:

| | Percent |
|---|---|
| Sodium chloride | 2.3 |
| Urea | 6.7 |
| Sulphite waste liquor solids | 10.5 |
| Formaldehyde | 7.5 |
| Water | 73.0 |
| | 100.0 |

The stock was first introduced into the solution prior to introduction of the formaldehyde. The drumming of the stock in the solution without the formaldehyde continued intermittently for 40 hours, at which time the formaldehyde was added and the drumming was continued for a further 8 hours. In this case the urea acts as a buffer to partially neutralize the acid of pickle to raise the pH to approximately 4.0 and it was found that the pH remained constant throughout the period that the stock was in the solution. After 48 hours the pH was lowered by the addition of 1% of hydrochloric acid to a level of approximately 1.5. The tanned material was then given a wash in 2% borax which brought the pH up to approximately 5.0. Thereupon 6% fat-liquor was given and the leather was pasted.

Example 8

*Stock material.*—Pickled splits, pH 1.5.

No pre-adjustment of pH was made and no pre-soak or pre-wash was given. The stock was drummed in a tanning solution of the following formula:

| | Percent |
|---|---|
| Sodium chloride | 7.0 |
| Urea | 3.6 |
| Sulphite waste liquor solids | 5.4 |
| Formaldehyde | 4.0 |
| Water | 80.0 |
| | 100.0 |

The stock was first introduced into the solution prior to introduction of the formaldehyde. The drumming of the stock in the solution without the formaldehyde continued intermittently for 40 hours, at which time the formaldehyde was added and the drumming continued for a further 8 hours. As in Example 7, the urea served to raise the pH to approximately 4.0 and the pH stayed at that level throughout the tanning operation. After 48 hours the pH was lowered by the addition of 1% of hydrochloric acid to a level substantially below 3.5. The tanned leather was then washed in warm water which brought the pH up to approximately 4.0 Thereupon the material was dyed with organic dyes fat-liquored and toggled.

Example 9

*Stock material.*—Pickled sheep, freshly de-greased, pH 1.5.

No wash, no rinse, no soak, put as is into tan of the following composition: 6 skins: Summary weight 5686 grs., 20% tan material thereof is 1137 grs. made up of urea, formaldehyde and sulphite waste liquor solids, conforming to the following proportions:

227 grs. urea
455 ml. formaldehyde
455 grs. sulphite waste liquor solids

The balance of the tan formula was made up of the following:

114 grs. sodium chloride
303 grs. sodium acetate
3100 ml. water

PROCEDURE

Hide material and all ingredients in dry form were put into the drum. Water and formaldehyde were mixed and run into the drum while the latter was turning. After the last addition, the duration of the tan was fixed as 2 hours. Then 330 ml. concentrated hydrochloric acid in double the amount of water was added. Drumming continued for 30 minutes and thereupon let stand overnight.

Washing in water, fat liquoring and so forth, following in routine manner.

Example 10

*Stock material.*—Pickled goat.

No wash, no soak, no rinse, put into tan as is, of the following composition: 20% tan material based on 346 grs. pickled weight material:

14 grs. urea
28 ml. formaldehyde
28 grs. sulphite waste liquor solids
7 grs. sodium chloride
19 grs. sodium acetate
190 ml. water

PROCEDURE

Same as in Example No. 9. The dry ingredients together with the hide material were put into the drum while the mixture of formaldehyde and water was added while turning. The duration of the tan was put at 4 hours. At the end of this time a mixture of 23 ml. hydrochloric acid in double the amount of water was added and 30 additional minutes drummed, and let stand overnight. Washing, fat liquoring and so forth followed in routine manner.

Example 11

*Stock material.*—Pickled calf.

No wash, no rinse, no soak, put into tan as is, of the following composition: 20% tan based on 2230 grs. pickled weight material, gives a unit weight formula as follows:

89 grs. urea
178 grs. sulphite waste liquor solids
178 ml. formaldehyde
45 grs. sodium chloride
119 grs. sodium acetate
1200 ml. water

PROCEDURE

Same as in Example 9. The duration of the tan was put at 7 hours. After that time, the batch was acidified with 160 ml. hydrochloric acid in double the amount of water. Routine procedure followed.

The calf material was fully tanned and of excellent quality.

Example 12

(Furfural tan) jet-diamond-black

*Stock material.*—Pickled sheep.

No wash, no rinse, no soak, but into tan as is, of the following composition:

Furfural tan:
    15 grs. sodium chloride
    25 grs. sodium bisulphite
    60 grs. urea
    30 grs. sulphite waste liquor solids
    60 ml. furfural
    90 ml. wood alcohol
    400 ml. water

PROCEDURE

The mixture of water, wood alcohol and furfural are run into the drum containing the hide material and the dry ingredients. The tan duration is 1½ hours. 40 ml. concentrated sulphuric acid in 350 ml. water are then added and 30 minutes added to the drumming.

The batch is let stand overnight in which time the colour develops.

Example 13

(Paraformaldehyde tan)

*Stock material.*—Pickled calf.

No wash, no rinse, no soak, put into tan as is, of the following composition: 20% tan based on 2200 grs. fresh pickled weight material gives a unit weight formula as follows:

88 grs. urea
176 grs. sulphite waste liquor solids
59 grs. paraformaldehyde
44 grs. sodium chloride
115 grs. sodium acetate
1150 ml. water

PROCEDURE

Same as in Example No. 11. The duration of the tan is likewise put at 7 hours, then acidified with 160 ml. concentrated hydrochloric acid. No water added.

Let stand overnight. Then processed in routine manner. (2% non-ionic oil as fat-liquor.)

Example 14

(Sulphuric acid)

*Stock material.*—100 lbs. pickled splits all weights. 19 pieces.

No wash, no soak, no rinse, put into tan as is, of the following composition:

6 lbs. urea
12 lbs. sulphite waste liquor solids
12 lbs. formaldehyde
3 lbs. sodium chloride
8 lbs. sodium formate
(Approx.) 10 gals. water

PROCEDURE

Intermittent drumming for approximately 15 hours. Then acidified with about 10% $H_2SO_4$ until pH is down to 1.5. Levelled to 6 oz. weight and fat-liquored with 8% non-ionic oils.

Example 15

(Paraformaldehyde)

*Stock material.*—Pickled splits. 75 lbs. medium to heavy weight.

No wash, no soak, no rinse, put into tan as is, of the following composition:

6 lbs. urea
12 lbs. sulphite waste liquor solids
4 lbs. paraformaldehyde powder
5 lbs. sodium formate
(Approx.) 5 gals. water

PROCEDURE

Intermittent drumming for 12 hours. pH is steady at 4.0. Acidified with dilute hydrochloric acid: pH 1.5. Levelled to 6 oz. weight: 75 lbs. then fat-liquored.

Example 16

(Hexamethylene-tetramine)

*Stock material.*—Pickled split and side, pH 1.5, 85 lbs. combined weight. Approximately 30% tan.

No wash, no soak, no rinse, put into tan as is, of the following composition:

5 lbs. urea
10 lbs. sulphite waste liquor solids
8 lbs. hexamine
3 lbs. sodium chloride
(Approx.) 8 gals. water

PROCEDURE

The pH is 5.5 after a few hours' drumming. Dilute hydrochloric acid is added until the pH is down to 4.0. Intermittent drumming for 24 hours, then acidified, and routinely processed.

Example 17

((Alkaline-sulphite waste) tan at pH 8.0)

*Stock material.*—Pickled splits and side. Combined weight: 150 lbs.

Washed in running water for 5 hours, then put into tan:

10 lbs. urea
20 lbs. sulphite waste liquor solids
8 lbs. paraformaldehyde
5 lbs. sodium chloride
12.5 lbs. sodium bicarbonate
7.5 lbs. ammonia
10 gals. water

PROCEDURE

Drummed for 15 hours. Let stand overnight, then acidified and routinely processed.

Example 18

((Neutral-sulphite waste) tan at pH 7.0+)

*Stock material.*—Pickled splits. 155 lbs.

Drummed in 25 gals. water to which 25 lbs. of sodium sulphite have been added. Let stand overnight. pH is now 7.0. Drained, then put into tan of:

10 lbs. urea
20 lbs. sulphite waste liquor solids
8 lbs. paraformaldehyde
8 lbs. sodium acetate
5 lbs. ammonia
12 gals. water

PROCEDURE

Drummed for 20 hours intermittently, then acidified and routinely processed.

Example 19

((Alkaline-liquor) kraft tan at pH 8.0)

*Stock material.*—Pickled split and side. Combined weight 77 lbs.

Drummed in 3% sodium bicarbonate, 2% sodium acetate solution until pH is 8.0 throughout, then drained and put into tan of:

5 lbs. urea
20 lbs. kraft liquor solids
4.5 lbs. paraformaldehyde powder
7 gals. water

PROCEDURE

Drummed intermittently for 20 hours, then acidified to pH 3 and processed.

Example 20

((Alkaline-liquor) kraft tan at pH 7.0)

*Stock material.*—Pickled splits and side. Combined weight 60 lbs.

Drummed in 5% sodium carbonate solution until pH throughout is 7.5, then drained and put into tan of:

4 lbs. urea
16 lbs. kraft liquor solids
4 lbs. paraformaldehyde powder
5 lbs. sodium carbonate
5 gals. water Drummed intermittently for 20 hours, then acidified to pH 3 and processed.

Example 21

((Alkaline-liquor) kraft tan at pH 8.0+)

*Stock material.*—Pickled split and side. Combined weight 66 lbs.

First rinsed in plain water, then drummed in 5% sodium bicarbonate solution until pH is 8.0 throughout. Now drained and put into tan of:

8 lbs. urea
30 lbs. kraft liquor solids
6 lbs. paraformaldehyde powder
7 gals. water.

Drummed intermittently for 20 hours, then acidified to pH 3 and processed.

Example 22

((Alkaline-liquor) kraft tan at pH 8.0+)

*Stock material.*—Pickled splits and side. Combined weight 25 lbs.

Washed and neutralized in 5% sodium bicarbonate solution until pH is 7.0+ throughout. Drained, then put into tan of:

1 lb. urea
2.5 lbs. kraft liquor solids
0.5 lb. sodium sulphite
2 gals. water

First drummed for 10 hours, then 2 lbs. fluid formaldehyde added and drummed another 10 hours, then acidified to pH 2.5 and processed.

Example 23

((Alkaline-liquor) kraft tan at pH 8.0+)

*Stock material.*—Pickled splits and side. Combined weight 90 lbs.

Drummed in 5% sodium bicarbonate solution until pH is 7.0+ throughout. Drained and then put into tan of:

5 lbs. urea
12.5 lbs. kraft liquor solids
4 lbs. paraformaldehyde powder
2.5 lbs. ammonia
7 gals. water Drummed for 20 hours, then acidified to pH 2.5 and processed in routine post tan operations.

Example 24

((Alkaline-liquor) kraft tan at pH 8.0+)

*Stock material.*—Pickled split and side. Combined weight 120 lbs.

Washed and drummed in 5% sodium bicarbonate solution until pH is 8.0 throughout, then drained and put into tan of:

10 lbs. urea
25 lbs. kraft liquor solids
7.5 lbs. paraformaldehyde
10 gals water
pH 8.0–8.5

Drummed for 20 hours, then acidified to pH 3 and processed in routine post tan operations.

Example 25

((Alkaline-black liquor) tan at pH 8.5+)

*Stock material.*—Bated splits and side. Combined weight 25 lbs. As is put in tan solution of the following composition:

1.5 lb. urea
5.0 lbs. black liquor solids
¼ lb. sodium sulphate
1 lb. paraformaldehyde
2½ gals. water Drummed intermittently for 20 hours, then acidified and processed.

Example 26

((Mixed alkaline-kraft and black liquor) tan at pH 8.0+)

*Stock material.*—Bated splits and side. Combined weight 25 lbs. As is put in tan solution of the following composition:

1.5 lbs. urea
2½ lbs. black liquor solids
2½ lbs. kraft liquor solids
¼ lb. sodium sulphite
1 lb. paraformaldeyde
2½ gals. water Drummed intermittently for 20 hours, then acidified and processed.

Example 27

(Acetaldehyde and formaldehyde)

*Stock material.*—Bated splits and side. Combined weight 100 lbs. As is put in tan of the following composition:

6 lbs. urea
12 lbs. sulphite waste liquor solids
2 lbs. acetaldehyde
10 lbs. formaldehyde
5 lbs. sodium chloride
10 gals. water Drummed intermittently for 20 hours, then acidified and processed after standing overnight.

Example 28

(Glyoxal and formaldehyde)

*Stock material.*—Bated splits and side. Combined weight 100 lbs. As is put in tan of the following composition:

6 lbs. urea
12 lbs. sulphite waste liquor solids
2 lbs. glyoxal
10 lbs. formaldehyde
5 lbs. sodium chloride
10 gals. water Drummed intermittently for 20 hours, then acidified and processed after standing overnight.

Example 29

(Crotonaldehyde and formaldehyde)

*Stock material.*—Bated splits and side. Combined weight 100 lbs. As is put in tan of the following composition:

6 lbs. urea
12 lbs. sulphite waste liquor solids
2 lbs. crotonaldehyde
10 lbs. formaldehyde
5 lbs. sodium chloride
10 gals. water Drummed intermittently for 20 hours, then acidified and processed after standing overnight.

Example 30

(Thiourea and urea)

*Stock material.*—Bated splits and side. Combined weight 100 lbs. As is put in tan of the following composition:

2 lbs. thiourea
4 lbs. urea
12 lbs. sulphite waste liquor solids
12 lbs. formaldehyde
5 lbs. sodium chloride
10 gals, water Drummed intermittently for 20 hours, then acidified and processed after standing overnight.

Example 31

(Furfural and formaldehyde)

*Stock material.*—Bated splits and side. Combined weight 100 lbs. As is put in tan of the following composition:

6 lbs. urea
12 lbs. sulphite waste liquor solids
½ lb. furfural
10 lbs. formaldehyde
5 lbs. sodium chloride
10 gals. water Drummed intermittently for 20 hours, then acidified and processed after standing overnight.

Example 32

(Re tan on chrome)

*Stock material.*—Partially chrome-tanned splits. Weight 25 lbs. Put as is into tan of the following composition:

3 lbs. sulphite waste liquor solids
1.5 lbs. urea
1.5 lbs. sodium chloride
0.5 lb. alum
4 gals. water Drummed for 8 hours in this solution then 2 lbs. formaldehyde added and drumming continued for another 3 hours. Then acidified and processed.

Example 33

*Stock.*—2 medium sides (cowhides), Bronson type, bated, weight 42 lbs.

The tanning solution was prepared as follows:

6 gals. (Imperial) water
3 pints fluid formaldehyde (37%)
3 lbs. powdered melamine formaldehyde resin ("Ciba M. R.")
4 oz. caustic soda These ingredients were dissolved in a tanning drum for about an hour. Then 10 lbs. of kraft liquor solids (unrefined solids from East Angus, Quebec) were added. The charge was drummed until the kraft liquor solids were dissolved. The pH was then found to be 10. The sides were then added. The charge was drummed for about 6 hours. The charge was then acidified with dilute hydrochloric acid until the pH was within the range from about 1.5 to about 2. After 40 minutes the drum was rested and allowed to stand overnight.

The resulting leather was then processed in routine manner. This resulted in leather of excellent quality.

Example 34

*Stock.*—2 sides extra heavy Bronson type, weighing 65 lbs.

The bated stock had a pH of 8.0.
The tanning solution was prepared as follows:

6 gals. water
5 lbs. melamine formaldehyde resin ("Ciba M. R.")
14 lbs. sulphite waste liquor solids (Three Rivers Mill, St. Lawrence Corp.)
2 pints of fluid formaldehyde The constituents were first dissolved in a tanning drum and the solution found to have a pH of 7.2. The sides were then added. The charge was drummed for 5 hours after which penetration was complete. The pH had dropped to within the range from about 6.6 to about 6.9.

The charge was then acidified with dilute hydrochloric acid and drummed for about 40 minutes. The pH dropped to about 1.5. The charge was allowed to rest a few hours and was then "horsed" and allowed to stand overnight. The tanned hide was then processed in a routine manner. The resulting leather was of excellent quality.

Example 35

*Stock.*—2 extra heavy sides fresh from the bate, weight 54 lbs.

The soaking solution was made up in a tanning drum as follows:

6 gals. water
2 lbs. melamine formaldehyde resin ("Ciba M. R.")
14 lbs. sulphite waste liquor solids (Three Rivers Mill of St. Lawrence Corp.)
2 qts. fluid formaldehyde
2 lbs. urea The solution was drummed in the tanning drum for about one hour until it had become dissolved. The solution then had a pH of 7. The sides were then added and the charge drummed for about five hours. The charge was then acidified with dilute hydrochloric acid, drummed for 40 minutes, and allowed to stand overnight. The pH had dropped down to about 2.0.

The tanned hide was processed in the usual manner to produce leather of excellent quality.

Example 36

*Stock.*—2 extra heavy sides fresh from the bate and weighing 56 lbs.

The soaking solution was made up in a tanning drum as follows:

6 gals. water
2 lbs. melamine formaldehyde resin ("Cyanamid Parez No. 607")
10 lbs. kraft solids (East Angus Mill, St. Lawrence Corp)
2 qts. fluid formaldehyde
2 lbs. urea This solution was drummed for about 2 hours until thoroughly dissolved. The solution then had a pH of 11. The sides were then added. The charge was drummed for about 6 hours then acidified with dilute hydrochloric acid until the pH had dropped to about 2. The charge was drummed for 40 minutes and allowed to stand overnight. The tanned hides were processed in the usual manner, resulting in excellent leather.

Example 37

*Stock.*—2 bated sides, weight 50 lbs.

The tanning solution was prepared as follows in a tanning drum:

5 gals. water
10 lbs. sulphite waste liquor solids (Three Rivers Mill)
6 lbs. urea-formaldehyde-resin (water-soluble)
1 lb. melamine formaldehyde resin ("Ciba M. R.")
½ pint fluid formaldehyde The pH was adjusted to between 6 and 7. After complete solution, the stock was added and drummed for 8 hours. Then the solution was acidified to a pH below 2.0 and let stand overnight.

It was then processed in a routine manner to produce leather.

Example 38

*Stock.*—2 bated sides weight 55 lbs.

The tanning solution was prepared as follows in a tanning drum:

5 gals. water
10 lbs. kraft liquor solids (East Angus Mills, St. Lawrence Corp.)
1 lb. melamine formaldehyde resin ("Cyanamid Parez No. 607")
6 lbs. urea-formaldehyde-resin (water-soluble)
7 oz. para-formaldehyde After complete solution the pH was approximately 8.5. The stock was now added and drummed for 6 hours after which time complete soaking was reached. The batch was now acidified to a pH below 3.0 and let stand overnight. The stock was then processed in a routine manner to produce leather.

Example 39

*Stock.*—2 medium sides (cowhides) bated stock with a pH of 8.0 weighing 46 lbs.

The tanning solution was prepared as follows:

5 gals. water
10 lbs. sulphite waste liquor solids (Three Rivers Mill)
3 lbs. melamine formaldehyde resin ("Cyanamid Parez No. 607")
4 lbs. urea-formaldehyde-resin (water-soluble)
1 pint fluid formaldehyde
2 oz. caustic soda The caustic soda was dissolved in the water first. Then other ingredients were added and drummed until a clear solution was obtained. The pH was 7.5. The stock was then added and drummed for about 5 hours until complete penetration of the soaking solution had been obtained.

The solution was thereupon acidified to a pH of about 2.0 and allowed to stand overnight. The tanned hides were processed further in routine manner.

Example 40

*Stock.*—2 medium sides (cowhides) bated stock with a pH of 8.0, weighing 43 lbs.

The tanning solution was prepared as follows:

5 gals. water
10 lbs. kraft liquor solids (East Angus Mill, St. Lawrence Corp.)
2 lbs. melamine formaldehyde resin ("Ciba M. R.")
5 lbs. urea-formaldehyde-resin (water-soluble)
1 pint fluid-formaldehyde After complete solution the pH was approximately 8.5. The stock was then added and drummed for 5 hours after which time the batch was acidified to a pH below 3.0 and let stand overnight. The tanned hides were processed further in the usual routine manner.

Example 41

*Stock.*—2 medium sides (cowhides) bated stock with a pH of 8.0, weighing 47 lbs.

The tanning solution was prepared as follows:

5 gals. water
10 lbs. sulphite waste liquor solids (Three Rivers Mill)
1 lb. melamine formaldehyde resin ("Cyanamid Parez No. 607")
3 lbs. urea
2 lbs. urea-formaldehyde-resin (water-soluble)
6 pts. fluid formaldehyde Before the stock was added, all the ingredients were dissolved until a clear solution was obtained. The pH was approximately 6.5 to 7.0. The stock was now added and drummed for approximately 5 hours after which time the batch was acidified to a pH below 3.0 and left to stand overnight. The tanned hides were then processed further in the usual routine manner.

Example 42

*Stock.*—2 medium sides (cowhides) bated stock with a pH of 8.0, weighing 44 lbs.

The tanning solution was prepared as follows:

5 gals. water
10 lbs. kraft liquor solids (East Angus Mill, St. Lawrence Corp.)
1 lb. melamine formaldehyde resin ("Ciba M. R.")
4 lbs. urea
1 lb. urea-formaldehyde-resin (water-soluble)
1 lb. para-formaldehyde Before the stock was added, all the ingredients were dissolved until a clear or near-clear solution was obtained. The pH was now approximately 8.5. The stock was then added and drummed for approximately 5 hours after which time the batch was acidified and let stand overnight. The tanned hides were then processed further in the routine manner.

*Example 43*

Stock.—2 medium sides (cowhides) bated stock with a pH of 8.0 weighing 45 lbs.

The tanning solution was prepared as follows:

5 gals. water
10 lbs. sulphite waste liquor solids
4 lbs. urea
3 lbs. urea-formaldehyde-resin (water-soluble)
3 qts. fluid formaldehyde
½ lb. melamine formaldehyde resin ("Ciba M. R.")

The ingredients were first dissolved to a clear solution. The pH was now approximately 6.5. The stock was now added and drummed for approximately 5 hours after which time the batch was acidified to a pH below 3.0 and let stand overnight. The tanned hides were then processed further in routine manner.

*Example 44*

Stock.—2 medium sides (cowhides) bated stock with a pH of 8.0 weighing 45 lbs.

The tanning solution was prepared as follows:

5 gals. water
10 lbs. kraft solids (East Angus Mill, St. Lawrence Corp.)
½ lb. melamine formaldehyde resin ("Cyanamid Parez No. 607")
5 lbs. urea
2 lbs. urea-formaldehyde-resin (water-soluble)
1½ lbs. para-formaldehyde The ingredients were first dissolved until a clear or near-clear solution was obtained. The pH was then approximately 8.5. The stock was then added and drummed for approximately 5 hours after which time the batch was acidified to a pH below 3.0 and allowed to stand overnight.

The tanned hides were processed further in routine manner.

NOTE.—Bated stock was used in the examples for convenience and not for expediency.

I claim:

1. A process of producing leather comprising soaking leather stock in an aqueous solution of lignin-containing material selected from the group consisting of sulphonic acid-lignin and alkali lignin, said aqueous solution having a pH above about 3.5 in the case of sulphonic acid-lignin, said aqueous solution having a pH above about 6.5 in the case of alkali lignin when said alkali lignin is kraft lignin, and said aqueous solution having a pH above about 8.5 in the case of alkali lignin when said alkali lignin is not kraft lignin, and a water-soluble condensation product of a water-soluble aldehyde with a member of the group consisting of monomeric double acid amides and amino triazines, then acidifying the solution without heating to precipitate the active substance in situ as a water-insoluble precipitate, said acidification being to a pH below about 2.5 when said lignin material is a sulphonic acid lignin and to a pH below about 5 when said lignin material is an alkali lignin.

2. A leather made by the process of claim 1.

3. A process according to claim 1, in which the member of the group consisting of monomeric double acid amides and amino triazines is urea and the aldehyde is formaldehyde.

4. A process according to claim 1, in which the member of the group consisting of monomeric double acid amides and aminotriazines is melamine and the aldehyde is formaldehyde.

5. Leather made by the process of claim 1, in which the member of the group consisting of monomeric double acid amides and aminotriazines is urea.

6. Leather made by the process of claim 1, in which the member of the group consisting of monomeric double acid amides and aminotriazines is melamine.

7. A process according to claim 1, wherein said water-soluble condensation product is formed in situ.

8. A process according to claim 1, wherein said water-soluble condensation product is added to the aqueous mixture as a pre-condensate.

9. A process of producing leather comprising soaking leather stock in an aqueous solution having a pH above about 8.5 of an alkali-lignin, and a water-soluble condensation product of a water-soluble aldehyde with a member of the group consisting of monomeric double acid amides and amino triazines, then acidifying the solution to a pH below about 5 without heating to precipitate the active substances in situ as a water-insoluble precipitate, and maintaining the liquid in contact with the stock without heating whereby the precipitate is fixed in and on the stock.

10. A process according to claim 8, in which the member of the group consisting of monomeric double acid amides and amino triazines is urea.

11. A process according to claim 8, in which the member of the group consisting of monomeric double acid amides and amino triazines is melamine.

12. Leather made according to the process of claim 8.

13. A process of producing leather comprising soaking leather stock in an aqueous solution having a pH above about 6.5 of a kraft lignin, and a water-soluble condensation product of a water-soluble aldehyde with a member of the group consisting of monomeric double acid amides and amino triazines, then acidifying the solution to a pH below about 5 without heating to precipitate the active substances in situ as a water-insoluble precipitate, and maintaining the liquid in contact with the stock without heating, whereby the precipitate is fixed in and on the stock.

14. A process of producing leather comprising soaking leather stock in an aqueous solution having a pH above about 3.5 of a sulphonic acid lignin, and a water-soluble condensation product of a water-soluble aldehyde with a member of the group consisting of monomeric double acid amides and amino triazines, then acidifying the solution to a pH below about 2.5 without heating to precipitate the active substances in situ as a water-insoluble precipitate, and maintaining the liquid in contact with the stock without heating whereby the precipitate is fixed in and on the stock.

15. A process of producing leather comprising soaking leather stock in an aqueous solution having a pH above about 3.5 of a sulphonic acid-lignin and a water-soluble condensation product of a water-soluble monomeric double acid amide with a water-soluble aldehyde, then acidifying the solution to a pH below about 2.5 without heating to precipitate the active substances in situ as a water-insoluble precipitate, and maintaining the liquid in contact with the stock without heating whereby the precipitate is fixed in and on the stock.

16. A process according to claim 15, in which the amide is urea.

17. Leather made by the process of claim 15.

No references cited.